United States Patent
Applegarth

[11] 3,719,943
[45] March 6, 1973

[54] SELECTIVE IDENTITY SYSTEM

[75] Inventor: Alexander Rufus Applegarth, Plymouth Meeting, Pa.

[73] Assignee: Aradar Corporation, Plymouth Meeting, Pa.

[22] Filed: Feb. 18, 1971

[21] Appl. No.: 116,523

[52] U.S. Cl. ................................................343/7.3
[51] Int. Cl. .................................................G01s 9/56
[58] Field of Search ..........................343/6.5 R, 7.3

[56] References Cited

UNITED STATES PATENTS 3,521,175  6/1970  Aker...................................343/7.3 X Primary Examiner—T. H. Tubbesing
Attorney—Paul & Paul

[57] ABSTRACT

An improvement for aircraft DME equipment is disclosed, comprising electronic circuitry for selective identity of the DME station being tracked, and a method for providing such selective identity. The received identity signals are gated with an interrupt signal derived from the reply pulse detector, which interrupt signal carries information as to when the tracked ground station interrupts its replys to transmit its identity signals. Only those identity signals which coincide with interruption of reply signals are passed through the gate, such that other undesired identity signals are blocked, thereby avoiding ambiguity caused by simultaneous receipt of identity signals from other ground stations. The gated identity signal is connected to an audio device to produce a sound output. Alternatively, the interrupt signal may be connected directly to a separate audio signal generator, which generator produces audio signals corresponding to the identity signals of the tracked ground station.

4 Claims, 4 Drawing Figures

INVENTOR.
Alexander Rufus Applegarth
BY
Paul & Paul
ATTORNEYS.

3,719,943

SELECTIVE IDENTITY SYSTEM

BACKGROUND OF THE INVENTION

A. Field of the Invention

This invention lies in the field of distance measuring equipment for aircraft and, more particularly, systems for identifying the ground station with which the aircraft distance measuring equipment is communicating.

B. Description of the Prior Art

Distance measuring equipment (DME) is utilized as a portion of the basic short range air navigation system adopted as a world standard by the International Civil Aviation Organization (ICAO). The DME system comprises an interrogator-responsor carried aboard each aircraft capable of using this system, and a plurality of ground based transponder stations located at fixed known positions. The airborne interrogator generates a train of pulse pairs of electromagnetic energy within the frequency band 960–1,215 MHz which are received by the ground transponder, delayed by a fixed time, and then transmitted back to the aircraft on a different frequency within the above mentioned band. The responsor portion of the airborne equipment receives these reply pulse pairs and measures the time delay between interrogation and reply, which is a direct function of the distance between the aircraft and the ground station. This time delay is displayed on a distance indicator.

It is important that the aircraft operator be able to identify the particular ground station which he is using, so as to avoid misinformation. To accomplish this purpose, twice each minute, each ground station momentarily interrupts its reply transmissions and transmits, in their place, a train of uniformly spaced pulse pairs at the rate of 1,350 pulse pairs per second. The interruptions are keyed so as to generate a Morse code three letter identification. During the intervals between dots and dashes, the normal replies are transmitted. In order to provide identification, the conventional DME responsor may include a filter tuned to 1,350 Hz which produces an electrical output capable of operating an audio device such as a headset or loudspeaker. Thus, the aircraft operator hears a ground station identification signal consisting of a keyed 1,350 Hz tone.

The DME frequency channels, of which there are 126, are spaced at 1 MHz intervals. The ground transponder receivers are highly selective, such that the ground station will only reply to an interrogation on a particular channel. Consequently, there is no selectivity requirement for the airborne receiver to discriminate against replies to its own interrogations from ground stations on any other channel. Since it adds significantly to the cost of manufacture to provide the airborne responsor with a sufficiently high degree of selectivity such that only one given DME channel can be received at a time, and lack of selectivity does not affect the integrity of the distance information, some DME responsors have bandpasses permitting simultaneous receipt of several channels. Consequently, whenever the DME equipment is in operation, identity signals from more than one ground station may be received and detected simultaneously. This results in ambiguous identity information which cannot be relied upon to properly identify the station to which distance information is displayed. This is a potentially dangerous situation, and accordingly the less selective responsors generally are not equipped with any identity apparatus.

SUMMARY OF THE INVENTION

The primary object of the invention is to provide an improved means by which conventional DME responsors can provide a reliable and non-ambiguous identity signal.

It is a further object of this invention to provide an inexpensive and reliable improvement to conventional airborne equipment which overcomes the deficiencies of the prior art and permits non-ambiguous identification of the ground station being tracked.

Accordingly, this invention takes advantage of the fact that a DME responsor which is tracking a given ground station reply can detect a momentary interruption of such reply signals, but identity signals received from other ground stations do not produce detectable interruptions because they are not being tracked by the responsor. An interrupt detector circuit is connected to the output of the reply detector of the DME responsor, which interrupt detector produces a signal for the duration of each reply interruption. Such interrupt signals, which correspond to the keyed identity signals transmitted by the ground station, provide a first input into a two terminal AND logic gate. A narrow bandpass filter, centered about the 1,350 Hz identity signal frequency, is connected to the output of the DME receiver detector, so as to provide all received identity signals. Such detected identity signals are connected to the second input terminal of the two terminal AND gate, the output of such AND gate being the identity signal of, and only of, the ground station being tracked. As an alternate embodiment, the output of the interrupt detector is connected directly to and drives an audio generator in the aircraft, which generator is keyed on and off by the interrupt signal, such that it produces an identity signal corresponding to that transmitted by the ground station being tracked.

DESCRIPTION OF THE PREFERRED EMBODIMENTS

Figure 1:
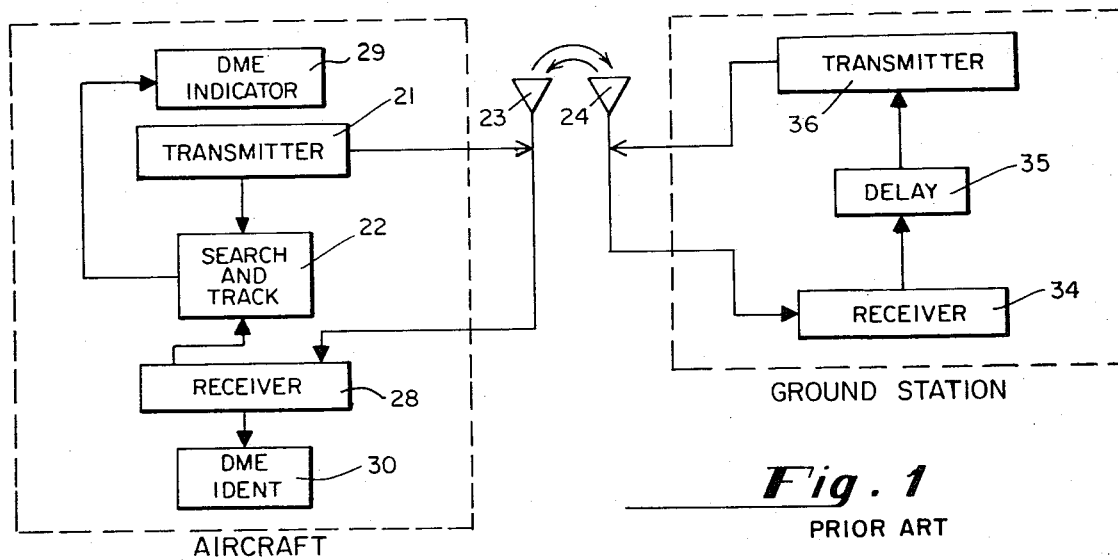
FIG. 1 is a block diagram of a conventional DME system.

Referring now to FIG. 1, a block diagram is shown of a conventional DME system. A transmitter 21 in the aircraft generates interrogation pulses, which are transmitted from aircraft antenna 23, and are received at the ground station by antenna 24. The received interrogation pulses are processed through receiver 34, delayed in delay circuit 35 by a predetermined time period, coupled to transmitter 36 and transmitted out through antenna 24.

The reply pulses are received at the aircraft through antenna 23 and processed in receiver 28. The selectivity of receiver 28 is such that, when the aircraft transmitter is tuned to a given ground station, receiver 28 can receive signals transmitted from other ground stations in addition to the one which is being interrogated. The reply pulses, detected in receiver 28, are connected to search and track circuitry 22, which tracks only the replies to the aircraft's interrogation signals. The time of receipt of such reply pulses is compared with the time of transmission of the interrogation pulses, and circuitry 22 generates an output signal representative of such time, which in turn corresponds to the distance from the aircraft to the ground station. Such output signal is coupled to DME indicator 29, for display to the aircraft operator. Any and all identity signals which are detected by receiver 28 are connected to DME ident circuit 30, which produces audio identification signals in the aircraft.

Figure 2:
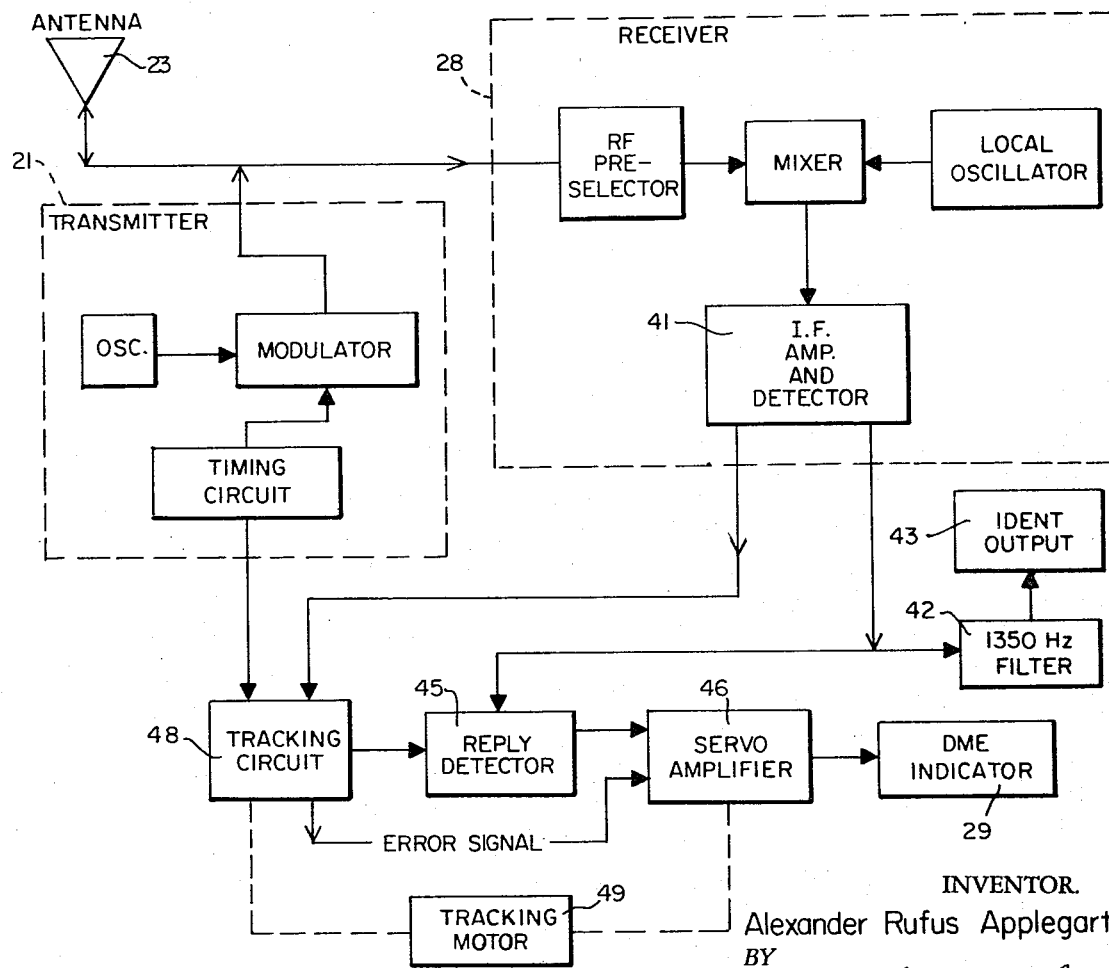
FIG. 2 is a block diagram of a conventional DME responsor located in an aircraft.

Referring now to FIG. 2, a more detailed block diagram is shown of a conventional DME aircraft responsor. Following amplification and detection of received signals in IF amplifier and detector 41, the signals are passed through a 1,350 Hz filter 42, designed to pass only identification signals. Such signals are then coupled to an ident output 43, typically in the form of a speaker or set of earphones. The output of detector 41 is also connected to reply detector 45, which generates an output signal as long as reply pulses are being detected. However, in the absence of detected reply signals, such as occurs when the ground station interrupts to transmit identity signals, there is no output signal from the reply detector. It is noted that standard equipment contains a memory circuit, such that the signal connected to servo amplifier 46 is not appreciably affected during the identification interrupt periods. However, prior to such memory circuit, the reply detector signal varies in time directly with the presence or absence of reply signals.

The tracking servo loop which includes tracking circuit 48, servo amplifier 46, and tracking motor 49, is well known in the art. See, for example, Aviation Electronics Handbook, Keith W. Bose, published 1962, and Maintenance Manual 3,304-600, December, 1965, Narco Scientific Industries, Inc., page 39. The servo system operates such that the aircraft responsor tracks only the reply signals which are replies to its own interrogations. Consequently, the output of reply detector 45 represents detection of reply signals only from the ground station which is receiving the aircraft's transmitted interrogations. The absence of an output from reply detector 45 correspondingly represents an interruption of reply transmissions from such ground station, such as is caused when the station transmits identity signals.

Figure 3:
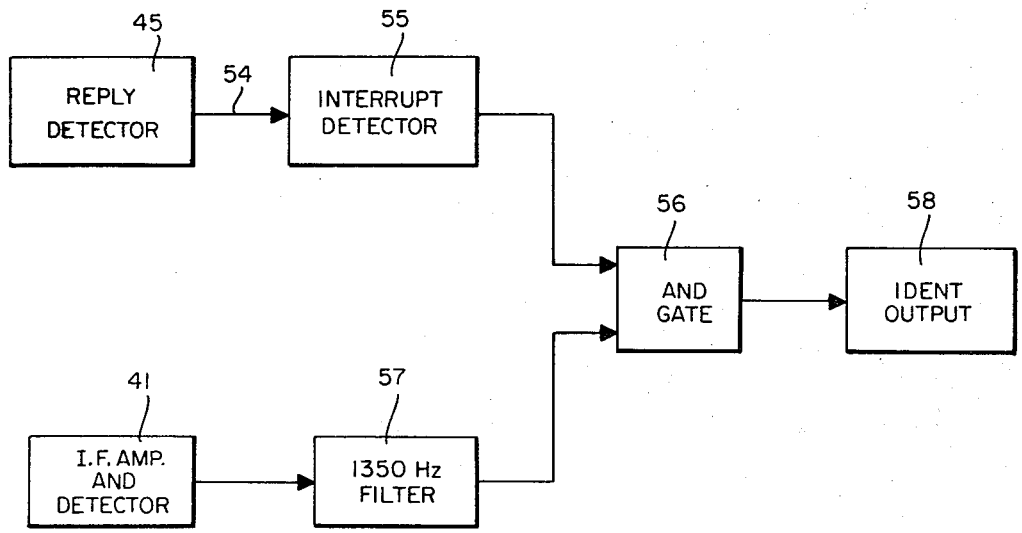
FIG. 3 is a block diagram showing the improvement of this invention.

Referring now to FIG. 3, the improvement of this invention is shown. The output of detector 41 consists of all received pulse signals as well as 1,350 Hz identity signals. A signal from reply detector 45 is connected by lead 54 to interrupt detector 55. Lead 54 is connected to reply detector 45 at a point prior to the memory circuitry, such that the signal connected to interrupt detector 55 changes instantly whenever there is an interruption of the tracked reply pulses. Interrupt detector 55 may be any conventional voltage comparator circuit, which detects the signal change representing the interruption. For example, interrupt detector 55 may be a simple Schmitt trigger circuit, which produces an output signal whenever the voltage of the input signal drops below a predetermined minimum. The Schmitt trigger output constitutes a DC voltage of sufficient magnitude to drive AND gate 56.

Thus, as long as reply signals are being received from the station being tracked, interrupt detector 55 puts out no signal, or no signal sufficient to properly drive AND gate 56. As soon as interruption occurs, and for the duration of such interruption, interrupt detector 55 puts out a signal sufficient to drive AND gate 56. At the same time, any and all received identity signals, which have passed through receiver 28, are transmitted through 1,350 Hz filter 57, and connected to a second input of the two input AND gate 56. AND gate 56 is a conventional logic circuit, which produces an output if, and only if, inputs appear simultaneously on both input terminals. Thus, only when interrupt detector 55 produces an output, does a received identity signal pass through AND gate 56, and energize the ident output 58. Any identity signals transmitted from ground stations other than the one being tracked are blocked by gate 56, since they do not coincide with an output from interrupt detector 55. Ident output 58 may be any conventional sound producing device, which is driven directly by the identity signals.

Figure 4:
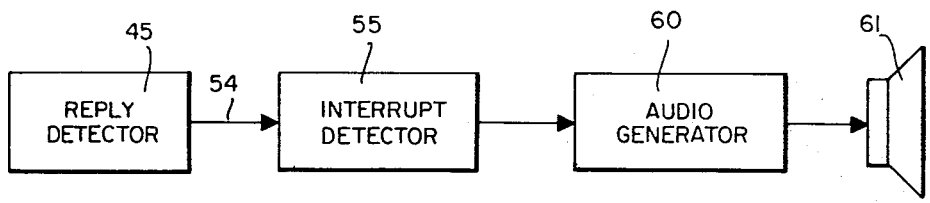
FIG. 4 is a block diagram of an alternate embodiment of this invention.

An alternate embodiment of this invention is shown in FIG. 4. The output of interrupt detector 55 is fed directly to an audio generator 60 placed in the aircraft. Audio generator 60 is normally in an off condition, but is driven to produce an output any time it receives a positive signal from interrupt detector 55. The output of audio generator 60 is coupled directly to speaker 61, or its equivalent. Since output signals from interrupt detector 55 correspond exactly to the interruptions produced by identification signals from the ground station being tracked, the output of audio generator 60 produces the same Morse code as transmitted by the ground station.

It is noted that in the alternate embodiment, an audio output is provided any time the reply signals are lost, for whatever reason. For example, if the attitude of the aircraft causes loss of contact with the ground station, a continuous audio sound is produced for the duration of such circumstance.

While the invention as described herein is illustrated with respect to DME equipment, it is appreciated that the invention may be used in any air-ground system where airborne equipment interrogates ground equipment and receives reply signals therefrom.

It is appreciated that certain design modifications may be made in the practice of this invention. For example, buffer amplifier stages may be connected to the output of interrupt detector 55 and filter 57, to insure a sufficient signal to drive AND gate 56. Similarly, additional amplification may be used to boost the output signal which drives ident output circuit 58. Like design modifications may be introduced in the improvement shown in FIG. 4. An identity sensor other than sound may be used, such as a flashing light.

I claim:

1. In aircraft equipment which communicates with a ground based transponder station by transmitting signals to and receiving reply signals from such ground station, such ground station periodically interrupting transmission of reply signals to transmit identification signals, apparatus comprising:
   a. a first path to detect said reply signals;
   b. a second path to detect said identification signals;

c. interrupt detector means in said first path for detecting said interruptions of ground station transmission and for generating interrupt signals having time durations coincident with said interruptions;

d. gate means, receiving said interrupt signals from said interrupt detector means and said detected identification signals from said second path, for gating said identification signals only during the duration of said interruptions; and e. indicator means driven by the output of said gate means for indicating said gated identification signals.

2. In aircraft equipment which communicates with a ground based transponder station by transmitting signals to and receiving reply signals from such ground station, such ground station periodically interrupting transmission of reply signals to transmit identification signals, apparatus comprising:

a. interrupt detector means for detecting said interruption of ground station transmission and for generating an interrupt signal having a time duration coincident with said interruption;

b. audio generator means, for generating an audio signal, being in a normally off condition, and generating said audio signal when driven by an input signal; and c. coupling means, coupling the output of said interrupt detector means to the input of said audio generator, whereby said generated audio signal is coincident with said interruptions.

3. A process carried out in an aircraft for non-ambiguously identifying a ground station, which ground station receives signals from said aircraft and transmits reply signals to said aircraft, said ground station periodically interrupting such reply transmission and transmitting identification signals during such interruptions, comprising the following steps:

a. receiving and detecting said reply transmissions;

b. detecting said interruptions;

c. generating interrupt signals having time durations corresponding to said interruptions;

d. receiving and detecting said identification signals;

e. gating said identification signals with said interrupt signals, whereby identification signals are gated only when coincident with said interrupt signals; and f. indicating said gated identification signals, thereby identifying said ground station to the exclusion of any other ground stations.

4. A process carried out in an aircraft for non-ambiguously identifying a ground station, which ground station receives signals from said aircraft and transmits reply signals to said aircraft, said ground station periodically interrupting such reply transmissions and transmitting identification signals during such interruptions, comprising the following steps:

a. receiving and detecting said reply transmissions;

b. detecting said interruptions;

c. generating interrupt signals having time durations corresponding to said interruptions;

d. generating audio signals derived from said interrupt signals, said audio signals corresponding in time to said interrupt signals and representing said ground station identification signals.

* * * * *